Aug. 4, 1970   C. R. B. LISTER   3,522,862
METHOD AND MEANS FOR GENERATING ACOUSTIC PRESSURE IN FLUID MEDIUM
Filed May 20, 1968   2 Sheets-Sheet 1
Fig.1.
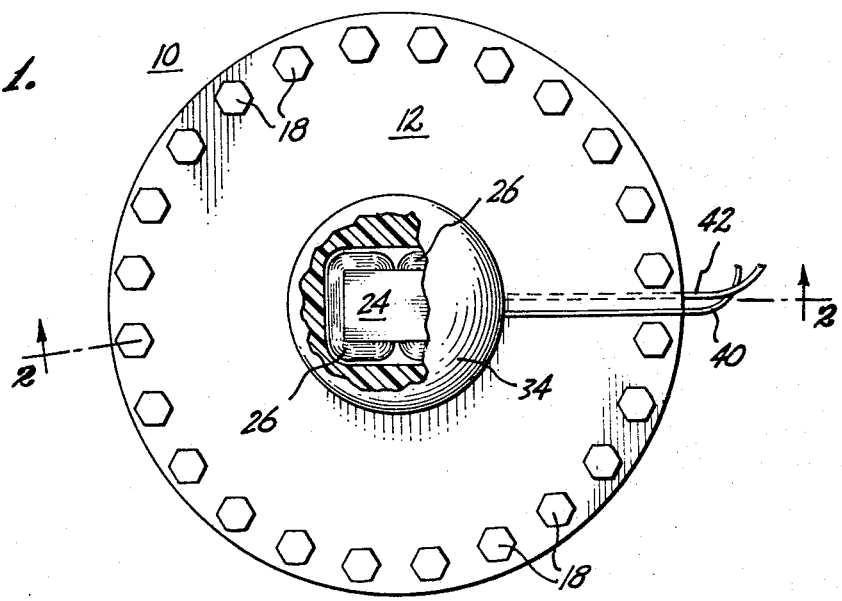
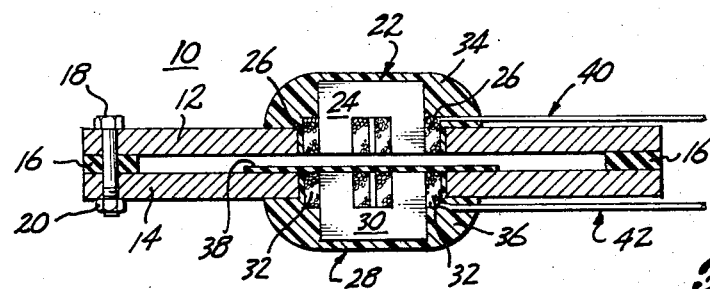
Fig.2.
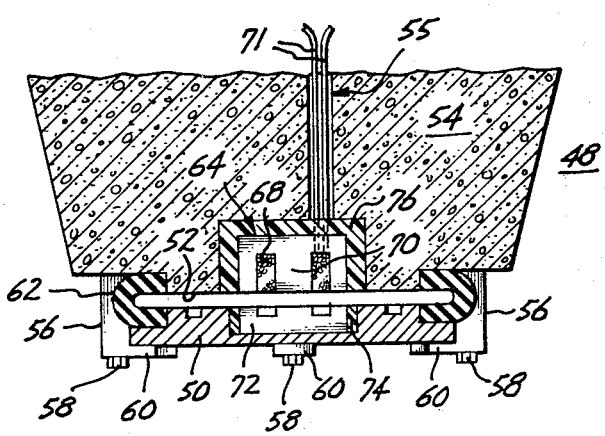
Fig.3.
INVENTOR.
CLIVE R.B. LISTER
BY Ford E. Smith
ATTORNEY Aug. 4, 1970 C. R. B. LISTER 3,522,862
METHOD AND MEANS FOR GENERATING ACOUSTIC PRESSURE IN FLUID MEDIUM
Filed May 20, 1968 2 Sheets-Sheet 2

INVENTOR.
CLIVE R. B. LISTER
BY Ford E. Smith
ATTORNEY

United States Patent Office 3,522,862
Patented Aug. 4, 1970

3,522,862
METHOD AND MEANS FOR GENERATING
ACOUSTIC PRESSURE IN FLUID MEDIUM
Clive R. B. Lister, 3136 Portage Bay Place E.,
Seattle, Wash. 98102
Filed May 20, 1968, Ser. No. 730,276
Int. Cl. G01v 1/04, 1/38
U.S. Cl. 181—.5                                    14 Claims

ABSTRACT OF THE DISCLOSURE

Method and means are disclosed for producing in a body of fluid a sound useful for seismic profiling. An immersed element is caused to move within, but away from, the immersing fluid in a manner avoiding cavitation while producing a negative acoustic pressure of predetermined magnitude. Thereupon the element momentarily impacts upon relatively immovable matter and abruptly reverses its direction of movement to produce a positive acoustic pressure materially greater than, and readily distinguishable from, the negative acoustic pressure.

BACKGROUND OF THE INVENTION

Field of the invention

The present invention relates to the art of generating acoustic pressure in a fluid medium and, more particularly, to improved methods and apparatuses for generating relatively low frequency, acoustic pressure pulses.

Description of the prior art

Seismic profiling is a method of geophysical prospecting which seeks to determine what underlies a body of water by examination of the structure of the echoes to periodically emitted sound pulses. The profiler functions much as a low-frequency echo sounder, and utilizes the fact that low-frequency acoustic waves readily penetrate unconsolidated sediments that often form the bottoms of water bodies. The lower the sound frequency that can be used, the greater is the penetration that can be obtained; and the shorter the pulse train that can be emitted, the finer is the resolution between adjacent reflectors in the sediment. The art of constructing sound sources for this work is thus primarily a search for generators that can produce a strong pulse of low-frequency sound without also producing a train of subsidiary pulses to confuse the record. However, the currently available sound sources designed for seismic profiling seldom, if ever, operate efficiently at low frequencies. Most of them emit pulses with a broad frequency band and have a complex pulse train which results in poor echo resolution. Examples of such prior art devices include the so-called "sparker," a high energy electrical spark device which discharges directly into the water, and the "airgun," which rapidly releases a volume of high pressure air in the water.

Development of the present invention stemmed from the discovery of a phenomenon during investigations of underwater explosions. It has been observed that the detonation of an explosive charge under water produces a primary pulse in the form of a positive pressure shock wave and an expanding bubble of gas. If the explosion takes place sufficiently far below the water surface, the expanding bubble reaches a maximum size—low pressure phase—under the influence of the outward momentum of the water around it, and then begins to collapse under the influence of hydrostatic pressure, gas-cooling and condensation. During the collapse, the surrounding water acquires an inwardly directed momentum which continues to compress the gas in the bubble as it grows smaller until a very high positive pressure is developed in the bubble which can reverse the motion. Thereupon, a second positive pressure shock wave is generated which often is almost as large as the original explosion. This second acoustic event is commonly referred to as a "bubble pulse." The effect is prolonged as further pulses of decreasing intensity continue to occur until the bubble breaks the water surface.

"Bubble pulses" constitute an undesirable complication to high energy, low frequency sound sources employed is seismic profiling. Such "bubble pulses" were observed during the development and testing of a series of electromagntic sound sources wherein a pair of circular plates were repelled from one another by electromagnetic means to provide positive pressure pulses for seismic work. When the plates returned to their original position under the influence of external water pressure and mechanical restraining springs, a second pulse was generated that was usually as large as the first. The second pulse was followed by a decreasing pulse train unless mechanical means were incorporated to dampen the rebound energy.

SUMMARY OF THE INVENTION

It is an object of the present invention to provide an improved method and apparatus for generating high energy, low frequency acoustic pressure waves in a liquid medium.

It is a further object of the invention to provide a high energy, low frequency acoustic pressure generator having means for effectively controlling movement of the pressure generating surface to prevent cavitation in the fluid medium surrounding the generator.

A further object of this invention is to provide a high energy, low frequency acoustic pressure generator which is relatively simple and inexpensive to manufacture, assemble and use.

The foregoing objects have been accomplished by the method and means of the present invention. High energy, low frequency acoustic pressure pulses are generated in a fluid medium by first causing an immersed diaphragm or diaphragm-like element to move within, but away from the immersing fluid in a manner avoiding cavitation. As the element moves away from the fluid, it produces a negative acoustic pressure of predetermind magnitude and transfers inwardly directed momentum to the surrounding fluid. Thereafter, the element momentarily impacts a relatively immovable structure and abruptly reverses its direction of motion. The abrupt reversal of element motion induces a similarly abrupt reversal of the inwardly directed momentum of the surrounding fluid and causes the generation of a positive acoustic pressure which is materially greater than, and readily distinguishable from, the negative acoustic pressure. The means for initiating movement of the element may be electromagnetic means mounted on a diaphragm and the relatively immovable structure, means for producing vacuum pressure between a diaphragm and the structure, or cam means between a diaphragm and the structure. The structure may be a permanently immovable member or a second diaphragm which flexes toward and away from the first diaphragm in opposition to it. The diaphragm or diaphragms may be either flat or concavo-convex in shape.

BRIEF DESCRIPTION OF THE DRAWINGS

In the drawings:

FIG. 1 is a plan view of an acoustic pressure generator constructed in accordance with the teachings of the present invention, with a portion of the device being broken away to reveal interior detail;

FIG. 2 is a sectional elevation view on line 2—2 of the acoustic pressure generator shown in FIG. 1; and FIGS. 3–6 are sectional elevation views showing alternate forms of acoustic pressure generators constructed according to the teachings of the present invention.

DETAILED DESCRIPTION OF THE PREFERRED EMBODIMENT

Figure 4:
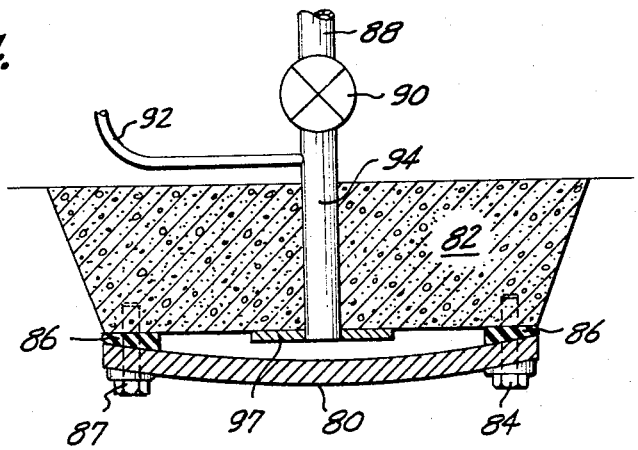

In FIGS. 1 and 2 there is shown a sound impulse generator 10 comprising a pair of annular metal plates or diaphragms 12, 14 spaced from one another by an annular gasket 16 sandwiched between the plates adjacent their peripheral edges. The plates are peripherally secured to one another by an annular series of bolts 18 and nuts 20 located adjacent their edges.

A bifurcated electromagnet 22 comprising a laminated yoke 24 having coils 26, 26 wrapped around the legs thereof is disposed in the open central portion of the annular plate 12. A substantially identical electromagnet 28 comprising a laminated yoke 30 having coils 32, 32 wrapped around the legs thereof is oppositely disposed in the open central portion of the plate 14 facing electromagnet 22. Fluid-tight insulating casings 34, 36 cover the outer portions of the electromagnets 22, 28, respectively. A resilient impact sheet 38 (e.g. rubber) may lie between the electromagnets for a purpose described hereinafter. The leads 40, 42 from the electromagnet coils 26, 32 extend through casings 34, 36 to a source of energy (not shown). The casing 34, 36 and the tightly secured annular gasket 16 render the assembly fluid-tight to maintain the interior portion thereof dry.

In operation, when the sound pulse generator 10 is immersed in fluid (e.g. water) and the electromagnets 22, 28 are pulsed with current, they will attract one another. The supply of current to the electromagnets should be regulated to lengthen the collapse time of the plates sufficiently to avoid cavitation in the fluid. As the plates flex inwardly or toward each other, drawing fluid with them, they will produce a low, but relatively steady, negative acoustic pressure in the fluid. When the plates impact their direction of movement is abruptly reversed and they rebound outwardly thus generating a positive acoustic pressure in the fluid having a magnitude substantially greater than that of the negative acoustic pressure. The impact sheet 38 reduces fracture of the electromagnets and plates when they impact.

Rebound of the plates should be controlled to prevent the generation of additional collapse cycles. This may be accomplished by controlling the decay of current supplied to the electromagnets so that the decaying magnetic force can absorb some of the rebound energy of the plates. By way of example, the current may be controlled to allow the magnetic force to decay quasi-exponentially so that it has reached about half its maximum value when impact occurs. The remaining magnetic force can then absorb some of the rebound force of the moving members and prevent a second impact from taking place.

The sound impulse generator 48 shown in FIG. 3 comprises a single rigid plate or diaphragm 50 retained adjacent the face 52 of a base member 54. A plurality of retaining dogs 56 are secured to the base member 54 by bolts 58, and include retaining arms 60 which overlie the peripheral edge of the plate 50. The plate is normally held spaced from the base member 54 by a compressible, annular gasket 62 which is here shown as C-shaped in cross-section.

Electromagnet 64 may comprise an E-shaped yoke having a coil 68 wrapped around the center leg 70 thereof. Magnet 64 is disposed in a cavity in the central portion of the base member 54. An armature 72, disposed in a cavity in the central portion of the plate 50 faces magnet 64. The armature 72 is bonded to the plate 50 by a body of bonding material 74. The electromagnet 64 is similarly embedded in the base member 54 by insulating material 76. A conduit 55 extends through the base member 54 and contains lead wires 71 which extend from the coil 68 to a source of electrical energy (not shown).

In operation, when the sound impulse generator 48 is immersed in fluid and electromagnet 64 is pulsed with current, the resulting electromagnetic force will attract the armature 72 and plate 50 against the small bias of the compressible annular gasket 62. This movement creates a negative acoustic pressure in the fluid. The supply of current to the electromagnet should be regulated to lengthen the collapse time of the plate sufficiently to avoid cavitation in the fluid. When the plate 50 impacts the base member 54, the outward rebound of plate 50 will generate in the fluid a positive acoustic pressure having a magnitude substantially greater than that of the negative acoustic pressure. The decay of the current supplied to the electromagnet 64 should be controlled in a manner such as that discussed above relative to the FIGS. 1–2 embodiment so that the decaying magnetic force will absorb some of the rebound energy of the plate and prevent the start of additional sound cycles.

In the sound pulse generator 78, illustrated in FIG. 4, gas pressure and the elasticity of the plate or diaphragm 80 are employed in place of electromagnetic force to generate motion. Plate 80 is peripherally secured to the base member 82 by bolts 84 adjacent its edge. The plate is normally held spaced from the base member by a compressible peripheral gasket 86 sandwiched between the edges of the plate and base member 82. A vent port 88, having a fast-acting valve 90 therein, and a pressure supply port 92 communicate with a common port 94 which, in turn, extends through the base member 82 and communicates with the space 96 between the plate and the base member. An impact block 97 is secured to the base plate around the common port 94 to prevent fracture of the plate and base member when they impact.

In operation, when the acoustic pressure generator 78 is immersed in fluid (e.g. water) and gas pressure is supplied to the air space 96 via the supply port 92 with the valve 90 closed, plate 80 will be bowed away from the base member 82 as shown in the figure. To initiate a sound pulse valve 90 is opened suddenly to connect the vent port 88 to the space 80 between the plate 82 and the base member, whereupon the elasticity of the plate will cause it to return toward the base member. As the plate accelerates inward, it will draw fluid with it to produce a negative acoustic pressure in the fluid. Upon impact with the base member, the plate will accelerate strongly outward and produce in the fluid a positive pressure pulse of a magnitude substantially greater than that of the negative pressure pulse. The elastic firmness of plate 80 and the level of positive pressure in the space inward of plate 80 should be controlled to avoid cavitation in the fluid, and closure of valve 90 should be timed to prevent the rebound energy of the plate from generating subsequent collapse cycles.

Figure 5:
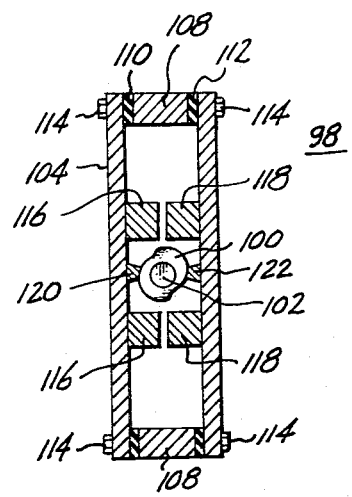

The acoustic pressure generator 98 shown in FIG. 5 may be circular or rectangular and longitudinally extended. It employs a double-lobed cam 100 mounted on a rotary shaft 102 for initiating movement of the plates or diaphragms 104, 106. The diaphragms are held spaced from one another by a spacer 108 sandwiched between a pair of gaskets 110, 112, and the entire assembly is held together by a series of bolts 114. Impact blocks 116, 118 are mounted on the inner faces of the diaphragms 104, 106, respectively, and inwardly projecting cam followers 120, 122 are mounted on the central portions of the diaphragms between the impact blocks.

In operation, acoustic pressure generator 98 is immersed in body of fluid, and the double-lobed cam 100 is rotated in a clockwise direction (as viewed in FIG. 5).

As the cam 100 rotates, it presses on the cam followers 120, 122 and deflects or warps the central portions of the diaphragms 104, 106 outwardly. Any positive acoustic pressure generated is of a very low order. When the crests of the lobes pass the followers, the outwardly bowed or deflected diaphragms 104, 106 spring inward toward one another and blocks 116, 118 impact. As the plates move inward, they draw fluid with them and create a low, but relatively steady negative acoustic pressure in the fluid. When the blocks 116, 118 impact, the inward bowed plates rebound outward with increased acceleration to generate a positive acoustic pressure in the fluid which is substantially greater than, and readily distinguishable from, the negative acoustic pressure.

In this embodiment, control of additional vibrations of the plates is limited and depends on the selection of an elastic material of predetermined elasticity or stiffness for the impact blocks 116, 118. The collapse time of the plates is dependent on their stiffness and should be sufficiently long to avoid cavitation in the fluid.

Figure 6:
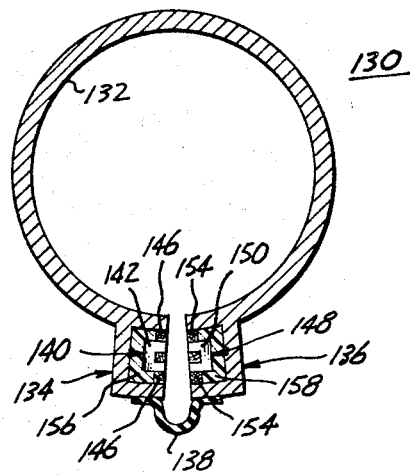

The sound impulse generator 130, shown in FIG. 6, comprises a longitudinally split cylindrical body 132 having generally cup-shaped flanges 134, 136 integrally formed adjacent the split edges. By way of example the length of the cylinder may be about ten times its diameter. A flexible strip 138, secured between the cup-shaped flanges 134, 136 normally seals the gap between the flanges, spaced from one another, as they appear in FIG. 6. A bifurcated electromagnet 140 comprising a yoke 142, having coils 146, 146 wrapped around the legs thereof, is disposed in flange 134. A substantially identical electromagnet 148 comprising a yoke 150 having coils 154, 154 wrapped around its legs is disposed in the flange 136. Bodies of insulating material 156 and 158 embed and separate the electromagnets 140 and 148, respectively, from their flanges 134 and 136.

In operation, when sound impulse generator 130 is immersed in fluid and current is supplied to the coils 146 and 154 of the electromagnet 140 and 148, the flanges 134 and 136 will be attracted toward one another to compress the cylindrical body 132. Such compression will draw fluid with the radially moving cylinder walls to create negative acoustic pressure in the fluid. When the split edges of the cylinder impact, the cylinder walls will accelerate outwardly to create in the fluid a positive acoustic pressure of a magnitude substantially greater than the negative pressure. The current supplied to the electromagnets 140, 148 should be controlled in a manner similar to that described above in connection with the FIGS. 1–2 embodiment to avoid cavitation in the fluid during the collapse cycle, and to permit the decaying magnetic force to absorb some of the rebound energy of the cylinder halves after impact to prevent the start of a new collapse cycle.

By way of example, a practical sound source may consist of opposed annular plates 12 and 14 of aluminum alloy, the plates being 24" in diameter and approximately ¼" thick. The plates are peripherally separated by a gasket ¾₄" thick, and the assembly is tightly secured about its periphery by bolts 18. The driving electromagnets 22 and 28 are each disposed in the central holes of annular plates 12 and 14, respectively. The magnets are held in position by plastic encapsulating material 34, 36, as shown in FIGS. 1 and 2. Upon the application of electrical energy through conductors 40, 42 from a charged capacitor or other suitable source, usually located at a remote position, the electromagnets are attracted to one another causing the plates to medially flex toward each other. The impact which is created is cushioned by a rubber sheet 38 between the magnets provided to prevent fracture of the plastic encapsulant. A large, smooth pulse of positive acoustic pressure is generated. The sound emitted by a device of the size described has most of this energy concentrated in a relatively narrow frequency band centered on about 250 Hz. If a charged capacitor is used as the source of energy, the amount of recoil occurring after the impact can be adjusted to a small value by varying resistance of the electromagnetic circuits.

There has accordingly been described above and shown in the drawings a new and useful system whereby high energy, low frequency acoustic pressure waves are generated in a liquid medium and in which system effective control of the movement of a pressure generating surface is employed to prevent cavitation. Means for practicing the system are also disclosed in several forms. The novel features characteristic of this invention are set forth with particularity in the appended claims, in which what is claimed is:

1. The method of producing sound impulses in a fluid medium by means of a movable element immersed in said medium so that only one face is exposed to said medium, comprising:

causing said movable element to move in a direction away from said fluid medium so as to accumulate in said fluid medium a first force tending to produce an appreciable negative acoustic pressure, the accumulation of said force being regulated in magnitude such that cavitation in said fluid medium is avoided;

momentarily impacting said movable element upon matter relatively immovable at the moment of impact and abruptly reversing the direction of movement of said element whereby a second force is produced in said fluid medium, tending to create an appreciable positive acoustic pressure of such magnitude as to be materially greater than and readily distinguishable from said negative acoustic pressure.

2. The method according to claim 1, wherein the movable element is caused to move by applying electromagnetic forces thereto.

3. The method according to claim 1, wherein the movable element is caused to move by applying gas pressure thereto.

4. The method according to claim 1, wherein the movable element is caused to move by a cam member which initially moves the element in a direction toward the fluid medium and thereafter allows the element to rebound in a direction away from the fluid medium.

5. The method according to claim 2, and further comprising the step of preventing subsequent impacting of the movable element upon the relatively immovable matter by removing the electromagnetic forces from the element at such a rate that the decaying magnetic force absorbs a portion of the rebound energy of the movable element after impact.

6. A sound impulse generator for operation immersed in a fluid medium, comprising:

a movable element in contact with the medium;

a structural member normally spaced from the movable element;

means for causing the movable element to move toward the structural member with a first force of predetermined magnitude, impact upon the structural member and rebound in a direction away from the structural member with a second force of substantially greater magnitude than the first force.

7. A sound impulse generator according to claim 6, wherein the movable element comprises a relatively flexible diaphragm element.

8. A sound impulse generator according to claim 7, wherein the structural member comprises a generally flexible diaphragm element adapted to flex toward and away from said movable element in opposition to it.

9. A sound impulse generator according to claim 6, wherein the movable element and the structural member is substantially flat, relatively flexible, plate member.

10. A sound impulse generator according to claim 6, wherein the movable element is a relatively flexible, generally arcuate-shaped member.

11. A sound impulse generator according to claim 6 in which the movable element comprises a substantially rigid plate flexibly mounted at its periphery.

12. A sound impulse generator according to claim 11 in which the structural member comprises a second similar substantially rigid plate flexibly mounted at its periphery.

13. A sound impulse generator according to claim 6 wherein the means for moving the movable element comprises electromagnetic force generating means connected both to the movable element and the structural member.

14. A sound impulse generator according to claim 6, wherein the means for moving the movable element comprises means for generating and releasing gas pressure between the movable element and the structural member.

References Cited

UNITED STATES PATENTS

| | | | |
|---|---|---|---|
| 2,364,679 | 12/1944 | Williams | 340—12 |
| 2,589,375 | 3/1952 | Harris | 340—12 |

RICHARD A. FARLEY, Primary Examiner

D. C. KAUFMAN, Assistant Examiner

U.S. Cl. X.R.

340—12